United States Patent [19]

Reinecke

[11] Patent Number: 4,685,745

[45] Date of Patent: Aug. 11, 1987

[54] MOTOR VEHICLE BRAKE PRESSURE-REGULATING APPARATUS

[75] Inventor: Erich Reinecke, Burgdorf, Fed. Rep. of Germany

[73] Assignee: WABCO Westinghouse Fahrzeugbremsen GmbH, Hanover, Fed. Rep. of Germany

[21] Appl. No.: 821,364

[22] Filed: Jan. 22, 1986

[30] Foreign Application Priority Data

Jan. 23, 1985 [DE] Fed. Rep. of Germany ....... 3502049
Jan. 23, 1985 [DE] Fed. Rep. of Germany ....... 3502051

[51] Int. Cl.$^4$ .................................................. B60T 8/58
[52] U.S. Cl. ...................................... 303/100; 303/111; 303/DIG. 3
[58] Field of Search ............... 303/95, 96, 98, 100, 303/102, 103, 111, DIG. 3, DIG. 4; 364/426

[56] References Cited

U.S. PATENT DOCUMENTS

| 3,790,225 | 2/1974 | Wehde | 303/DIG. 3 |
|---|---|---|---|
| 3,791,702 | 2/1974 | Burckhardt et al. | 303/100 |
| 3,802,745 | 4/1974 | Strifler et al. | 303/DIG. 4 |
| 3,871,718 | 3/1975 | Wurth | 303/DIG. 3 |
| 3,988,043 | 10/1976 | Reinecke | 303/DIG. 4 |
| 4,080,007 | 3/1978 | Acker et al. | 303/100 X |
| 4,203,632 | 5/1980 | Fabreges | 303/100 |
| 4,336,592 | 6/1982 | Beck | 303/DIG. 4 |
| 4,402,047 | 8/1983 | Newton et al. | 303/100 X |
| 4,414,630 | 11/1983 | Harris et al. | 303/DIG. 4 |
| 4,585,280 | 8/1986 | Leiber | 303/DIG. 4 X |
| 4,606,586 | 8/1986 | Eckert et al. | 303/DIG. 4 |

Primary Examiner—Duane A. Reger
Attorney, Agent, or Firm—J. O. Ray, Jr.

[57] ABSTRACT

A preselected parameter of the wheel brakes of a motor vehicle, to be equalized with respect to their braking force, is sensed. Such parameter is correlated with the amount of braking force being applied. A signal is generated by the preselected sensor, which is then used to control supplemental pressure-regulating valves, positioned in the brake pressure feed line to the respective wheel brakes. The parameter selected to be sensed can be, among other things, either the braking force or torque being applied or the wheel brake temperature.

35 Claims, 2 Drawing Figures

MOTOR VEHICLE BRAKE PRESSURE-REGULATING APPARATUS

BACKGROUND OF THE INVENTION

The present invention relates in general to a motor vehicle braking system and, more particularly, the invention relates to a brake pressure regulation apparatus on a motor vehicle that has brake pressures which are controlled by at least one arbitrarily activated brake application apparatus.

Prior to the present invention, it has been known that in the brake system of a motor vehicle, or a combination of vehicles consisting of the motor vehicle and a trailer, the pressurization of either pneumatically or hydraulically-operated wheel brakes with brake pressure from one or more pressure sources, can be controlled by means of a brake application apparatus which can be activated arbitrarily by the operator of such vehicle. The brake application apparatus is activated by the driver, using his hands or feet, and controls the level of the brake pressure as a function of either the activation force or the activation distance, or possibly by a combination of both. In the case of a vehicle-combination or a trailer, the brake application apparatus contains an apparatus that is controlled by the brake pressure in the motor vehicle for the simultaneous control of the brake pressure to the wheel brakes of the trailer.

Components which make up the wheel brakes exhibit not only fabrication tolerances, but also fluctuations, as a result of the material characteristics of the materials used in them, for example, fluctuations of the coefficient of friction of the brake lining. In such a case, the wheel brakes on both sides of one axis and/or the wheel brakes of one or more front axles can produce, during application, an uneven braking force or braking torque, from those produced by the wheel brakes of one or more rear axles of the motor vehicle or of the trailer or of the vehicle-combination and/or the wheel brakes of the motor vehicle can exhibit such differences in relation to the wheel brakes of the trailer. This can occur, even when the same brake pressure is released by the brake application apparatus to all the wheel brakes involved.

BRIEF SUMMARY OF THE INVENTION

According to the principles of the present invention, a preselected parameter of the wheel brakes of a motor vehicle, to be equalized with respect to their braking force, is sensed, which parameter can be correlated with the amount of braking force being applied. A signal is generated by the preselected sensor. The signal is then used to control supplemental pressure-regulating valves, which are positioned in the brake pressure feeds to the respective wheel brakes on such motor vehicle. The parameter selected to be sensed can be, among other things, either the braking force or torque being applied or the wheel brake temperature.

OBJECTS OF THE PRESENT INVENTION

It is an object of the present invention to provide a brake pressure regulation apparatus which, by relatively simple and economical means, can make possible an equalization of the braking forces or braking torques produced by the wheel brakes on the left and the right side of the motor vehicle on one or more axles and/or of one or more front axles and of one or more rear axles of the motor vehicle, or of the trailer, or of the vehicle-combination and/or of the motor vehicle and the trailer.

Another object of the present invention is to provide a brake pressure regulating apparatus that can be used both with either pneumatically or hydraulically-operated wheel brakes and also with a combination of these types of operation.

Still another object of the present invention is to provide a brake pressure regulating apparatus which can be used either with power-operated brakes, with power-assisted brakes, or with a manually-operated braking system.

Yet another object of the present invention is to provide a brake pressure regulating apparatus which substantially ensures the equalization of the braking forces or braking torques of the wheel brakes on both sides of one or more axles of the motor vehicle and/or of the trailer.

An additional object of the present invention is to provide a brake pressure regulating apparatus which will also substantially ensure the equalization of the braking forces or the braking torques of the wheel brakes on one or more axles of the motor vehicle to the braking forces or braking torques of the wheel brakes on one or more axles of the trailer.

It is also an object of the present invention to provide a brake pressure regulating apparatus that substantially ensures the equalization of the braking forces or braking torques of the wheel brakes of one or more axles of the motor vehicle, or of the trailer to the braking forces or braking torques of the wheel brakes of one or more other axles of the motor vehicle or of the trailer.

A further object of the present invention is to provide a brake regulating apparatus which substantially ensures the equalization of the total braking force of the wheel brakes of a motor vehicle to the total braking force of the wheel brakes of the trailer, if the two are combined in a vehicle-combination.

The above and various other objects and advantages of the present invention will become more apparent to those persons skilled in the motor vehicle braking art, from the following more detailed description, when such description is taken in conjunction with the attached drawings and the appended claims.

BRIEF DESCRIPTION OF THE DRAWINGS

FIG. 3 shows, schematically, an alternative brake system of a vehicle-combination with a brake application apparatus designed as an electrical brake system.

BRIEF DESCRIPTION OF THE PRESENTLY PREFERRED EMBODIMENTS OF THE INVENTION

Figure 1:
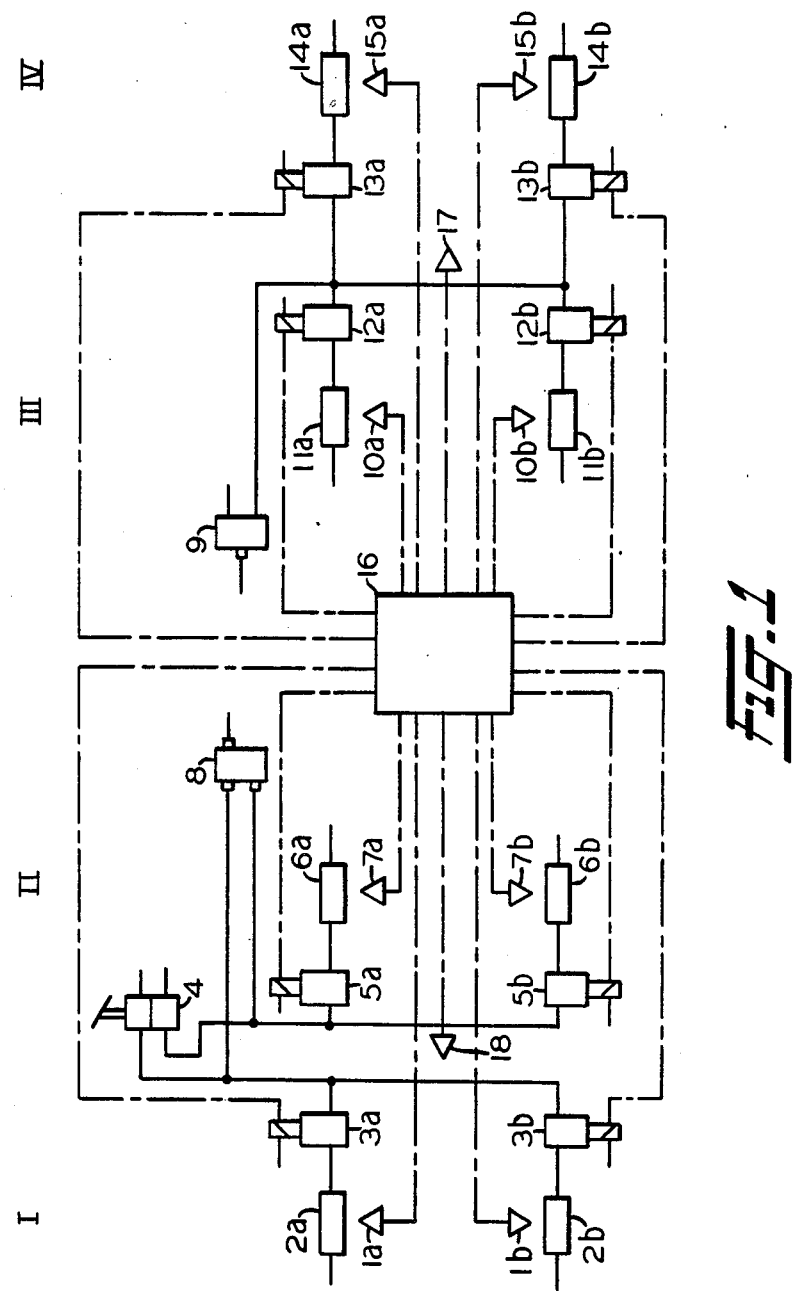
FIG. 1 shows, schematically, a fluid pressure responsive brake system of a vehicle-combination with a brake valve, and a trailer co-control operated according to the principles of the present invention.

In the drawing figures, the same reference numbers are used throughout for the same components. Further, as used in the drawing figures, the solid lines designate fluid pressure medium lines, and the broken lines designate electrical lines or connections. Also, as shown in the drawing figures, the index "a" refers to the right side of the vehicle, and the index "b" refers to the left side of the vehicle. It should be understood by those skilled in the art that, as used in the specification, the term "fluid pressure" is meant to include pneumatic, hydraulic, or a combination of both. It should also be understood that the term "wheel brakes" includes either drum or disc-type brakes.

In FIG. 1, the reference numbers 2, 6, 11 and 14, together with the appropriate vehicle side index (a or b), refer to wheel units and the corresponding fluid pressure responsive brake cylinders. Each of the wheel units 2, 6, 11 and 14 exhibit one or more wheels, including their suspension, and a drum or disc brake including the corresponding fluid pressure responsive brake cylinder(s) as wheel brakes.

The wheel units 2, 6, 11 and 14, which are always identified by the same number, are constructed in a known manner. Therefore, wheel units 2, 6, 11 and 14 are not described in any further detail. As shown in FIG. 1, wheel units 2, 6, 11 and 14, form axles I, II, III and IV; whereby the axles I and II are a front axle and a rear axle of a motor vehicle respectively, and axles III and IV are a front axle and a rear axle of a trailer respectively. Overall, the axles I to IV represent the axles of a vehicle-combination, whereby I and/or II are to be considered the front axle(s), and III and/or IV are to be considered the rear axle(s).

For the wheel brakes of the axles I, II, III and IV, there are sensor devices 1, 7, 10 and 15 respectively, identified by the appropriate vehicle side index (a or b). The individual sensor apparatus 1, 7, 10 and 15 can be either designed as a braking value sensor apparatus, which measures the braking force or its braking torque produced by the corresponding wheel brake on the occasion of a brake application, in which case, it emits braking value signals; or, in another configuration, the individual sensor apparatus 1, 7, 10 and 15 can be designed as a temperature sensor apparatus, which measures the temperature of the corresponding wheel brake (wheel brake temperature) during or after the application of the brake, in which case, it emits temperature signals. The details of the design of the braking value sensor apparatus, or the temperature sensor apparatus, will be explained hereinafter.

The individual sensor apparatus, however, can also be designed as a combined braking value and/or temperature sensor apparatus, if desired.

A brake value generally designated 4, a trailer control valve generally designated 8, and a trailer brake valve generally designated 9 form a presently-preferred brake application apparatus, which allows the vehicle driver to release a braking pressure to the wheel brakes from fluid pressure sources (not shown) as a function of the force applied to a control element of the brake valve 4, or the distance this control element is moved, i.e., depressed. The above-mentioned valves 4, 8 and 9 consist of known types in the transportation industry, and are therefore not described here in any further detail. The illustrated brake valve 4 has two circuits and supplies, connecting in a known manner, the brake fluid pressure medium to the wheel brakes, combined in their own circuit, of the axle I and the axle II along separate paths. The trailer control valve 8 also has two circuits which can also be connected in a known manner, i.e., it can be controlled separately by each of the above-mentioned circuits.

In the pressure medium lines, from the brake valve 4 or the trailer brake valve 9 to the individual wheel brakes, there is always an electrically-controlled pressure regulating valve, called the "ABS valve" (anti-locking brake valve) below, designed as a non-return and bleeder valve. These valves are identified, with the corresponding vehicle side index (a or b), by the reference number 3 for axle I, and the reference numbers 5, 12 and 13 respectively for the axles II, III and IV. Each ABS value 3, 5, 12 and 13 can be placed, by an appropriate activation of its magnet or magnets, into an open position, a closed position, or a bleed position. In the open position, the inflow portion and the outflow portion of each ABS value 3, 5, 12 and 13 is connected with one another. In the closed position, the connection between the inflow portion and the outflow portion is shut OFF. In the bleed position, the connection between the inflow portion and the outflow portion is also cut off, and the outflow is also connected with a pressure-relief connection. In the case of a pneumatic brake system, the pressure-relief is connected with the atmosphere.

The pressure-regulating valves 3, 5, 12 and 13 are connected, on the outflow portion side, with the corresponding wheel brake (to be precise, with the related brake cylinder). On the inflow portion side, the ABS valves 3, 5, 12 and 13 are connected with the brake valve 4 or the trailer brake valve 9, as illustrated in the drawing.

The number 16 designates an electronic control system. The electronic conrol system 16 exhibits (in a manner not illustrated) a comparison and regulation apparatus, as well as an anti-locking electronic system, which together with wheel skid sensors (not shown), form an anti-locking apparatus (ABS). The magnets of the pressure-regulating valves 3, 5, 12 and 13 (as shown in the illustration) are separately-connected with the electronic control system 16, and can be activated separately from the latter with an appropriate control signal.

The signal representative of braking force value and/or the temperature signal from the respective sensor devices 1, 7, 10, and 15 is fed to the electronic control system 16 for comparison and generation of a regulation control signal when appropriate.

The vehicle driver trips an application of the brake system, illustrated by exerting a force on, or by displacing, the control mechanism(s) of the brake valve 4. A braking pressure is thereby accumulated in the feed lines of the ABS valves 3 and 5, which is a function of the application force or the application distance. By means of this brake pressure, the trailer brake valve 9 is also activated via the trailer control valve 8, whereby the trailer brake valve 9 also releases a braking pressure into the feed lines of the ABS valves 12 and 13 which is (indirectly) a function of the force applied to the control element of the brake valve 4, or of the distance moved by the control element. In normal operation of the system, the ABS valves are in the open position at the beginning of the brake application. Therefore, initially, the full brake pressure supplied by the brake valve 4, and of the trailer brake valve 9, can be delivered to the wheel brakes 2, 6, 11 and 14.

The selected sensor devices 1, 7, 10 and 15 respectively, detect, each as a function of its configuration, the braking value produced by the corresponding wheel brake 2, 6, 11 and 14 or the temperature which occurs in the wheel brake, and emit corresponding braking value and/or temperature signals to the comparison and regulation apparatus of the electronic control system 16. The comparison and regulation apparatus, on the basis of programs it stores, compares the value of the signals of the various sensor devices 1, 7, 10 and 15 with one another, and forms a command value for the control of the ABS valves, 3, 5, 12 and 13. If the value of the signals compared are of different strengths, then the comparison and regulation apparatus switches the respective ABS valve, corresponding to the respective wheel brake with the stronger signal (the wheel brake with the higher braking value and/or the higher temperature), out of the open position and into the closed position or into the bleed position, until the difference determined between the value of the signals drops to zero or to a specified (allowable) limiting value. The zero difference in strengths, or the limiting value, thereby form the command value for the regulation. In this manner, the braking values are equalized, i.e., the braking forces or braking torques and/or the temperatures occurring in the wheel brakes being compared. The result is that, phenomena which can lead to uneven braking actions are substantially minimized. Specifically, an improved directional stability can be obtained during braking by virtually eliminating yaw moments, along with a uniform load on the wheel brakes and a uniform wear of the wear surfaces of the brakes, specifically of the brake linings.

In one presently-contemplated embodiment, the comparison and regulation apparatus compares the value of the signals delivered by the sensor devices, 1, 7, 10 and 15 of one axle, and also triggers the control process described above. For example, different braking values or wheel brake temperature may thereby be achieved in the wheel brakes of axle I. The same is true for the wheel brakes of axles II, III and IV in relation to one another. Therefore, for this reason, the yaw moments are substantially eliminated, and the directional stability during braking of the individual vehicles or the vehicle-combination is improved. At the same time, a uniform load on the wheel brakes is achieved, along with a uniform wear of such wheel brakes, specifically of the brake linings. Furthermore, in this embodiment, it is also possible that the wheel brakes can be controlled in a known manner as a function of the axle load, if desired.

In an alternative embodiment, the signals from the respective sensor devices 1, 7, 10 and 15 on different respective axles are compared with one another in the comparison and regulation portion of the electronic control system 16. An equalization of the braking value or of the wheel brake temperatures is thereby achieved for the respective axles.

In another alternative configuration, the signals from one or more of the sensor devices 1 and 7 on the motor vehicle are compared with signals from one or more of the sensor devices 10 and 15 on the trailer. In this manner, the braking forces and/or wheel brake temperatures of the individual vehicles of the vehicle-combination can thereby be equalized.

FIG. 1 shows, in addition to the above-mentioned devices, load sensors symbolized by 18 and 17, which measure the loading of the axles I, II, III and IV respectively, in comparison to a reference load, such as, full load or empty load.

In this alternative configuration, the signals from one or more sensor devices 18 on an axle of the motor vehicle are compared with the signals of one or more sensor devices 17 on an axle of the trailer. The result can be an equalization of the braking values and/or of the wheel brake temperatures between individual axles of the individual vehicles forming the vehicle-combination.

These load sensors 17 and 18 make possible a modification of the embodiment illustrated in FIG. 1 into other advantageous embodiments. The comparison and regulation portion of the electronic control system 16, if these load sensors 17 and 18 are present, can be designed so that it makes possible a comparison of the signals supplied by the sensor devices 17 and 18, not only among themselves, but also with the values specified as a function of the respective axle loads. In this manner, the invention makes possible a load-controlled regulation of the braking fluid pressures fed to the wheel brakes.

The anti-locking apparatus contained in the electronic control system 16, for the electrical connection shown, also acts on the magnets of the anti-locking brake valves and controls the valves as a function of the skidding of the wheels. The anti-locking brake system is designed to have priority over the comparison and regulation portion of the electronic control system 16. It is thereby guaranteed that the operation of the anti-locking brake system is not interfered with by the present invention.

The comparison and regulation portion of electronic control system 16 is also designed so that it is disabled if the braking pressure released into the feeds to the anti-locking brake valves exceeds a specified pressure. This brake pressure is preferably selected so that it indicates an emergency brake application. This substantially ensures that, in an emergency, the invention will not cause any loss of braking force.

If the wheel brakes are controlled as a function of the respective axle load, as described above, the comparison and regulation portion of the electronic control system 16 can exhibit a priority circuitry over this control (load-controlled braking). This priority circuit can be advantageously replaced in certain applications by an anti-locking brake system with a steep-drop recognition capability. As a result of this priority circuitry, the invention would be effective up to the release of a specified brake pressure by the brake valve 4 or by the trailer brake valve 9, and when this specified brake pressure was reached, the electronic control system 16 would disable the comparison and regulating portion; whereupon, on the axles regulated by the load-controlled braking system, only the equalization of the wheel brakes on the axle in question, between one another, would be possible.

Figure 2:
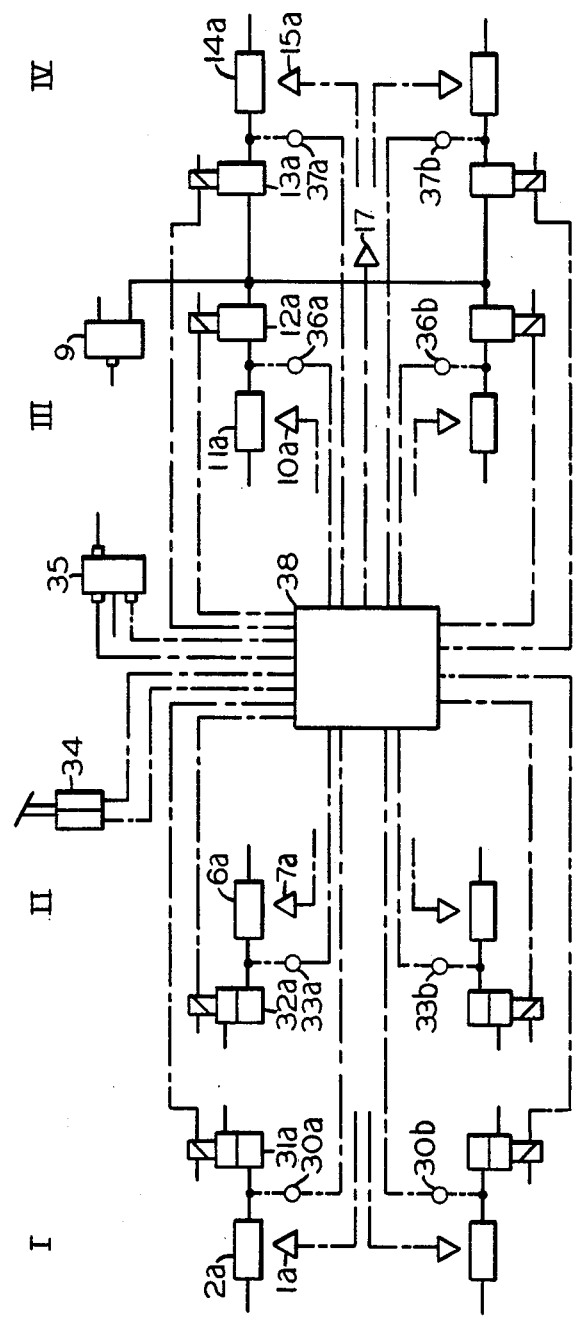
FIG. 2 shows, schematically, a fluid pressure responsive brake system of a vehicle-combination with an electrical brake control system (EBS) which can be operated according to the principles of the present invention.

FIG. 2 shows a brake system of a vehicle-combination, which, like the previous embodiment, exhibits wheel units 2, 6, 11 and 14, symbolized by a brake cylinder, assigned to respective axles I, II, III and IV. For each respective wheel unit 2, 6, 11 and 14, there is a sensor unit 1, 7, 10 and 15, respectively.

The trailer, again symbolized by axles III and IV, as in the previous embodiment, includes the trailer brake valve 9 and the anti-locking brake valves 12 and 13 respectively, each corresponding to a wheel brake.

For the sake of simplicity, the apparatus shown in FIG. 2 (and already illustrated in FIG. 1) is provided with reference numbers only for the right side of the vehicle. Also, for the sake of simplicity, the electrical lines proceeding from the sensor devices 1, 7, 10 and 15 are merely indicated.

The brake application apparatus is designed, in this embodiment, as an electrical braking control system (EBS). It consists of a brake transmitter 34, pressure modulators corresponding to a wheel brake of the motor vehicle and designed according to the presently-preferred embodiment as combination pressure modulators 31 and 32 respectively, a trailer control valve 35, and a trailer brake valve 9.

The brake transmitter 34 supplies an electrical output signal (brake signal), which is a function of the application force exerted on its control element or, alternatively, on the distance the control element is moved.

Each of the above-mentioned combination pressure modulators 31 and 32, which are magnetically-operated and which correspond to a wheel brake of the axles I and II, i.e. of the motor vehicle, combines the function of a pressure modulator and the pressure-regulating valve. As a pressure modulator, it releases, from one or more pressure sources (not shown), a braking pressure, the level of which is a function of the strength of the brake signal activating its magnet or magnets. As a pressure-regulating valve, it performs the functions of the anti-locking brake valve described in greater detail in the previous embodiment. The combination pressure modulator can be designed as a pressure modulator with an anti-locking brake valve connected downstream in the same housing, or it can be designed with fully integrated functions. It is apparent that, in place of a combination pressure modulator, it is also possible to use a pressure modulator and a separate anti-locking brake valve connected downstream.

The combination pressure modulators 31 and 32 are connected by axles on the inflow side with different pressure sources. The brake transmitter 34 exhibits two electrical circuits. The magnet or magnets of each combination pressure modulator 31 and 32 can be controlled by each of these electrical circuits, so that the brake system of the motor vehicle exhibits two electrical control circuits and two pressure medium circuits.

The brake application apparatus also includes the trailer control valve, designated 35 in this case, which is controlled electrically by the brake signals of both circuits of the brake transmitter 34. The trailer control valve 35, described in the preceding embodiment, works together with the trailer brake valve 9.

The brake pressure released on the outflow side of each combination pressure modulator 31 or 32 in the motor vehicle, or by each anti-locking brake valve 12 or 13 in the trailer, to the corresponding wheel brake, is always monitored, in this embodiment, by a pressure sensor 30, 33, 36 or 37 respectively, whose output signals are a function of the brake pressure and are fed as brake pressure signals to the electronic control system, which, in this case, is designated 38. Still within the context of the invention, they can then be further evaluated for additional purposes, as desired.

The brake signals of the brake transmitter 34 and the braking value and/or temperature signals of the sensor devices 1, 7, 10 and 15, which are only indicated, are fed to the electronic control system 38. On the output side, the electronic control system 38 is connected, via its own electrical connection, with the magnet or magnets of the combination modulators 31 or 32 and the anti-locking brake valves 12 or 13.

The electronic control system 38 is designed, in a manner known in the art and not described in any further detail, so that it can calculate and store a braking pressure correction as a command value for the brake pressure to be fed to the wheel brakes from the differences between two sensor devices, or between one sensor apparatus and a specified value which is a function of the axle load determined during or after one or more previous applications of the brake.

Depending on the specific characteristics of the motor vehicle and/or of the trailer and/or of the vehicle-combination, the braking pressure correction can be a difference or a quotient of the brake pressures in question. If these specific characteristics are such that the brake pressure correction must be variable, e.g. a function of the brake signal of the brake transmitter 34, the electronic control system 38 is designed so that it calculates and stores a family of characteristics of the brake pressure correction.

If the vehicle driver activates the brake transmitter 34, then the magnets of the combination pressure modulators 31 or 32 are activated by its brake signals via the electronic control system 38, in which they are processed and can be adjusted in accordance with criteria indicated below. The combination pressure modulators 31 or 32 thereby release a brake pressure to the appropriate wheel brake. The brake pressure, which accumulates in the corresponding brake cylinder, is sensed by the corresponding pressure sensor 30 or 33 and is reported to the electronic control system 38 in the form of a brake pressure signal. On the basis of the stored brake pressure correction and the brake pressure feedback, the electronic control system 38 makes certain that the brake pressures in wheel brakes compared with one another, or in wheel brakes compared with the load-dependent reference value, remain in a proper relationship to one another in accordance with the brake pressure correction value or the reference value.

In one of the embodiments described above, the brake pressure correction value can refer to the brake pressures of the left side or the right side of an axle, such as, the wheel brake 2a and the wheel brake 2b (not shown). If the electronic control system 38 determines that the brake pressures are not in a proper relationship to the braking pressure correction value, then it controls the one or more brake pressure modulators corresponding to the axle, so as to reestablish this relationship. The anti-locking brake valve function of the combination pressure modulator thereby goes into action.

Briefly, in the manner described above, the braking values or the wheel brake temperatures produced in the wheel brakes, equalized with one another, are compared with data derived from previous brake applications. This method is particularly well-suited for the equalization of temperatures, since such an equalization is difficult to perform during a single brake application on account of the measurement inertia and the dynamic temperature curve. There is a further simplification of the temperature measurement and equalization if the process is not conducted during a brake application, but at a specified time afterward.

It is apparent that, in the manner described, the actions of the wheel brakes on both sides of the same axle can be carried out analogously on all the axles. However, the braking values and wheel brake temperatures of wheel brakes on different axles can be equalized not only within the motor vehicle and/or within the trailer, but also within the vehicle-combination considered as a whole and/or optimized with regard to the load on the brakes, specifically with regard to the wear of the brake linings. The above-mentioned equalization is not possible wherever the axles and/or the individual vehicles of the vehicle-combination are loaded differently. In this case, braking value and/or temperature signals are not compared with the values of other wheel brakes or axles, but with a reference value derived from a family of specified characteristics in the electronic control system 38. As a result of the comparison with the specified value and an appropriate control of the combination pressure modulators 31 or 33 and/or anti-locking brake valves 12 or 13, a brake pressure distribution can be achieved which is adapted to the axle loads or the loads in the individual vehicles of the vehicle-combination.

The braking value correction can therefore be aimed, on the one hand, at an equalization of braking value and/or temperature, and, on the other hand, on an adjustment of the braking values and/or temperatures of the wheel brakes monitored by the sensor devices as a function of the load. A combination of both objectives is also possible, such as, in the form of a simultaneous equalization of the wheel brakes on two sides of one axle and a load-controlled adjustment of the wheel brakes thus equalized with one another to the wheel brakes of another axle (which may also have been equalized with one another).

For the adjustment as a function of the load, the trailer again exhibits the load sensor 17, while the load values of the motor vehicle are measured by load sensors (not shown) of a load-controlled braking system.

The electronic control system 38 contains the load-controlled braking system (in a manner not illustrated) whose measurement sensors are the above-mentioned load sensors in the motor vehicle and the load sensor 17 in the trailer. The electronic control system 38 also includes (in a manner not illustrated and in connection with other measurement sensors also not illustrated) an anti-locking brake system, a transmission control which operates as a function of wheel skidding, and a braking force regulator which operates as a function of retarder torque, as well as a retarder control.

Otherwise, the comments made above (with regard to the embodiment illustrated in FIG. 1) apply to this embodiment too, as appropriate. The comments made with regard to this embodiment also apply, as appropriate, to the embodiment illustrated in FIG. 1.

Both embodiments of the present invention can also be realized without the supplemental apparatus mentioned in the descriptions of the drawings.

The invention can also be applied only on individual axles of a vehicle-combination, or on their component parts. In addition to its applications in the illustrated service brake systems, the invention can also be applied in emergency brake and parking brake systems. It is further apparent that the remarks made above, but which have not been mentioned in the descriptions of the figures, apply, as appropriate, for the embodiments illustrated in the figures.

Finally, it will be apparent to a specialist in the field that the preceding comments have not exhaustively described the field of application of the invention. Specifically, all the explanations apply, as appropriate, for a motor vehicle or a trailer as an individual vehicle. To the extent that the vehicle-combination or its components have more axles or more wheel brakes per axle than illustrated, the above comments apply as appropriate.

In the case of a vehicle-combination, the invention offers the above-mentioned advantages, especially if the motor vehicle and the trailer, or the axles whose braking forces are to be equalized, have essentially the same relative loading.

The wheel brakes can be combined in brake circuits. For example, the wheel brakes of one or more front axles or the wheel brakes of one or more rear axles of the motor vehicle and/or of the trailer can be combined into one brake circuit. Wheel brakes can also be combined into one brake circuit on diagonally-opposite axle sides, or parts of the diagonally-opposite axle sides. The motor vehicle or the trailer can also exhibit several brake circuits; and the other part of the vehicle-combination, only a single brake circuit.

The motor vehicle and/or the trailer can, in a known manner, exhibit one or more brake pressure regulators corresponding to one or more axles or one or more wheel brakes, e.g. inertial braking force regulators, or retarder torque braking force regulators.

In embodiments in which the braking forces or braking torques of the wheel brakes on both sides of one or more axles of the motor vehicle and/or of the trailer are to be equalized, the use of known load-controlled braking force regulators (ALB) is also possible.

The invention can be designed, in relation to the above-mentioned additional braking force regulators, with a priority circuit for partial brakings. Since most brake applications take place in the partial braking range, in this manner the advantages of the invention can be applied without adversely affecting the overall layout of the brake system.

In one configuration, the invention proposes that the braking forces or braking torques of at least two wheel brakes be sensed, whereby the sensors can advantageously consist of deformation sensors which detect the deformation of components, e.g. of the axle body, caused by the braking force or the braking torque.

In another configuration, the invention teaches the sensing of the temperature of at least two wheel brakes. This configuration can be advantageously realized if the wheel brakes are designed, in a known manner, as drum or disc brakes and the temperature sensor is located in the brake lining support and/or in the brake lining. The temperature sensor could thereby be located on the brake lining support or on the brake lining at an appropriate spot and at an appropriate distance from the friction surface, so that a temperature signal proportional to the load is emitted.

With the temperature-sensing configuration described above, it may be advantageous to install several temperature sensors over the circumference and/or across the width of the brake lining and to use, as the temperature signal, the (arithmetic or weighted) average value of the signals of the individual temperature sensors.

It would also be advantageous to sense the temperature of the brake drum or of the brake discs, since this would eliminate the distortions and delays caused by the low thermal conductivity of the brake lining material while achieving increased precision.

It would also be desirable, in certain instances, to sense the brake lining wear or the remaining lining thickness. Such an embodiment, however, in view of the properties of modern brake lining materials, would result in measurable wear values, specifically usable differences in wear values, only over long periods of operation, and would therefore be very slow to provide useful information. The present invention, on the other hand, has the advantage that it makes possible a rapid reaction to any non-uniformities it finds on the sensed wheel brakes.

In an advantageous embodiment, the invention is suitable for use in a brake circuit of a motor vehicle or a trailer which exhibits at least one wheel brake or one group of wheel brakes for each side of the vehicle, whereby there is a pressure-regulating valve in the pressure medium feed line to each wheel brake or group of wheel brakes, and whereby each wheel brake or group of wheel brakes is assigned at least one braking value or temperature sensor. In this case, non-uniformities are exclusively monitored and equalized on one axis, and it does not matter whether the absolute braking pressure level of the braking circuit is acted on by additional pressure regulators.

The invention makes it possible to eliminate all or most of the yaw movements, so that there is an improvement in the directional stability of the motor vehicle and/or of the trailer, and/or of the vehicle-combination.

Additional advantages offered by the invention include a uniform, or more uniform, loading of the wheel brakes and simultaneously an even wear of the wheel brakes. These advantages lead to an increase in the economy of motor vehicle operation.

The invention can be realized with all known types of brake application devices, specifically with a driver's control valve, or with an electric brake control system (EBS).

In the case of an EBS, there is a hand-operated or foot-operated brake control, which imparts an application force or an output signal (brake signal) which is a function of the application distance as a command value for a pressure modulator.

In the case of an EBS, at least in the motor vehicle, but preferably for each axle or wheel brake, there is a pressure modulator, which releases a braking pressure from a corresponding hydraulic or pneumatic source as a function of the strength of the braking signal. The pressure modulator or modulators, therefore, belong to the brake application apparatus.

In another embodiment of the EBS, there is preferably an electronic braking pressure regulation apparatus and a pressure-regulating valve in the motor vehicle and/or in the trailer, but preferably one pressure-regulating valve per axle or per wheel brake, and one braking pressure sensor per pressure-regulating valve. In this case, the brake pressure regulating apparatus controls the braking pressure with the braking signal as a reference variable and the output signals from the braking pressure transmitter as the regulating variables, by controlling the pressure-regulating valves.

In the case of a vehicle combination, the brake application apparatus can include, for the co-control of the braking pressure to the wheel brakes of the trailer, a trailer control valve or a pressure-medium control line or an electrical control line to the trailer brake system.

In the embodiments with a driver's control valve and EBS, the pressure-regulating valves are located between the wheel brakes and the driver's control valve or the pressure modulators. In the latter case, the pressure modulators can be combined with the pressure-regulating valves into combination modulators.

In a presently preferred embodiment of the invention, the pressure-regulating valves include an open position, a closed position, and a bleed position. They are, therefore, also suited as anti-locking valves for an anti-locking brake system. The invention can, therefore, be advantageously realized in a motor vehicle and/or in a trailer and/or in a vehicle-combination which has an anti-locking brake system, in which case, the EBS must have a circuit which gives it priority over the invention.

In certain embodiments of the invention, simply stated, measured braking force or braking torque or temperature deviations are equalized, even as the braking application is in progress. The term "deviation", therefore, includes not only the deviation of the braking value signals or temperature signals, relative to one another, but also includes a deviation from a value specified as a function of the load. This specified value can, for example, be used to take into consideration the different relative load status of the axles and/or of the motor vehicle and of the trailer. In these cases, the electronic control system is designed so that it controls the pressure-regulating valve, corresponding to the wheel brakes, with the highest or excessive braking value and/or temperature signal, in the sense of an equalization of braking value of temperature equalization (to one another and/or to the specified value). In the case of the configuration of the pressure-regulating valves as anti-locking brake valves, that means that the anti-locking brake valve is essentially controlled to switch from the open position to the closed or the bleed position until the deviation is reduced to zero or to a specified limit value. The command value, formed by the electronic control system, is, in this case, equal to zero or to the limit value.

In another embodiment, simply stated, a braking pressure correction value is formed as a command value from the braking and/or temperature signals derived on the occasion of one or more previous brake applications, according to which the braking pressure supplied by the brake application apparatus to the wheel brakes is corrected. This braking pressure correction can take into consideration different relative loads on the axles and/or of the motor vehicle and the trailer. In this embodiment, the pressure which builds up in the wheel brakes corresponding to the braking value sensors or the temperature sensors is monitored by pressure sensors, whose output signal (braking pressure signals) are fed to the electronic control system. The electronic control system is thereby designed so that it calculates and stores, from the braking value or temperature signals fed to it during or after the previous brake application or applications—possibly taking into consideration the relative loading of the axles or components of the vehicle-combination corresponding to the sensed wheel brakes—a family of characteristics for a braking pressure correction value, specifically for the difference on the quotients of the braking pressures fed to the wheel brakes, and when the brakes are applied, regulates the pressure-regulating valves according to the current braking pressure correction value. The electronic control system can also be designed so that it updates the braking value correction or its family of characteristics on the basis of the braking value and/or temperature signals fed to it during or after the application of the brake. The signal evaluation, after the previous braking or brakings, or after the application of the brake, is of particular importance for the temperature signals. For this evaluation, a representative time after the brake application can be determined, in which, independent of the dynamic temperature curve during the brake application, reliable measurement results can be achieved. It is also possible to use, instead of the braking value or temperature signals of each brake application, to form or update the braking pressure correction value, the signals derived during representative braking conditions.

The braking pressure sensors, which are necessary in the embodiment described immediately above, can be combined with the braking pressure sensors provided in the above-mentioned anti-locking brake system or on the pressure modulators.

In the variants of the two above-mentioned embodiments in which, as mentioned, the electronic control system determines the command value, taking into consideration the load status of the various axles or components of the vehicle-combination, the invention offers a solution for a load-controlled braking force regulator which requires no additional equipment. The invention offers the possibility of the combination of such a load-controlled braking force regulator with a regulation to equalize the braking value or temperature. For example, the electronic control system can form the command value in the partial braking range below an upper limit of the braking pressure supplied by the brake application apparatus or its activation force or its application distance to equalization, and beyond that, as a function of the load. Thus, for most brakings, which take place in the partial braking range, an even load on the wheel brakes is guaranteed; while for higher brakings, priority is given to the safety of the braking process.

In this case, the electronic control system must also be fed load signals characterizing the loading of the axles or the components of the vehicle-combination, which correspond to the wheel brakes monitored by the sensor devices.

The invention can be disabled above a specified value of the application force or of the application distance of the brake application apparatus, whereby this value can specifically represent the case of an emergency braking. In this manner, the invention would not interfere with the full utilization of the full braking force or braking torque potential available in the motor vehicle or in the vehicle-combination.

The electronic control system, or parts of it, if any, can be advantageously combined structurally or electrically with the braking value sensors, the temperature sensors, the pressure-regulating valves, the brake transmitter, the pressure modulators, the pressure-regulating apparatus, an anti-locking brake system, a load-controlled brake system, braking force regulators which operate as a function of the inertia or the retarder torque, or parts of these components.

The invention can also be advantageously used to monitor the brake lining wear. In one embodiment, for this purpose, there is a distance sensor in the brake lining support or the brake lining, which when the brake is applied, measures its distance from the brake drum or the brake disc, and feeds an output signal corresponding to this distance as the wear value signal to the electronic control system, whereby the electronic control system is designed so that it emits output signals and/or values corresponding to the wear value signal. The above-mentioned distance sensor can be structurally combined with the brake valve sensors or a temperature sensor.

In another embodiment, a temperature sensor, or its feed line, is located so that its point nearest the brake drum or the brake disc comes into contact with the brake drum or the brake disc when the maximum allowable brake lining wear occurs, and thereby closes an electrical indicator and/or warning circuit.

In another embodiment, the relationship between the brake lining temperature, or change in temperature at a given braking pressure, and the brake lining wear is used to monitor the latter. In this case, the temperature signal is fed to an evaluation apparatus which, on the basis of a family of characteristics of the correlation between temperature and temperature change, braking pressure, and brake lining wear, emits a wear value signal and thus controls a wear value indicator apparatus and/or a wear alarm apparatus. In this case, the family of characteristics can also take into consideration the dependence of the above-mentioned factors on the initial velocity of a brake application. For this purpose, signals which are a function of velocity are fed to the evaluation apparatus. Finally, the temperature sensors can also be used to monitor the wheel brakes, specifically the brake linings or the brake discs or the brake drums, to a specified maximum temperature. In this case, an electrical indicator and/or alarm circuit is controlled by means of the temperature signals.

In FIG. 3 of the drawing, solid lines represent pressure medium lines, and dotted lines represent electrical lines or connections. The letter "a" represents the right side of the vehicle, and the letter "b" represents the left side of the vehicle.

The brake cylinders 2a, 2b, 9a, 9b, 14a, 14b, 20a and 20b can be pressurized by the pressure medium for the appropriate wheel units, which include one or more wheels, including their suspension, as a support element; and a drum or disc brake, including the corresponding brake cylinder(s), as wheel brakes.

The wheel units, identified by the same number, designed in a known manner and therefore not described in any greater detail, form axles I, II, III and IV, whereby the axles I and II are a front axle and a rear axle of a tractor, and the axles III and IV are the front axle and rear axle of a trailer, respectively. Overall, the axles I to IV represent the axles of a vehicle-combination, whereby I and/or II are to be considered its front axle(s), and III and/or IV are to be considered its rear axle(s).

There are sensor devices corresponding to the wheel brakes, so that the sensor devices 1a, 1b are assigned to the wheel brakes of axle I; and the sensor devices 10a, 10b or 13a, 13b or 21a, 21b are assigned to the wheel brakes of axles II, III and IV, respectively. The individual sensor apparatus, as a braking value sensor apparatus, can measure the braking force, or its braking torque produced by an application of the brake on the corresponding wheel brake, in which case, it emits braking value signals. In another configuration, the individual sensor device, as a temperature sensor device, can measure the temperature of the corresponding wheel brake (wheel brake temperature) which occurs when the brake is applied, in which case, it emits temperature signals. With regard to the details of the configuration as a braking value sensor device or a temperature sensor device, reference is made to the above remarks. The individual sensor device, however, can also be designed as a combined braking value and/or temperature sensor device.

The brake system (shown in FIG. 3) includes a brake application device, which consists of a brake transmitter 11 and parts 5 of compound pressure modulators 6a, 6b, 7a, 7b for the motor vehicle and a trailer control valve 12 and a trailer brake valve 15 for the trailer.

The brake transmitter 11 issues an electrical output signal (braking signal) which is a function of the application force or of the application distance imparted to the control device.

Each of the above-mentioned magnetically-operated combination pressure modulators 6a, 6b, 7a, 7b corresponding to a wheel brake on the axles I or II, i.e. of the vehicle, combines the functions of a pressure modulator and a pressure-regulating valve. Using the example of the combination pressure modulator 6a, details are described, which apply as appropriate for the other pressure modulators. The portion 5 of the pressure modulator 6a releases, from one or more pressure medium sources (not shown), a braking pressure, the level of which is a function of the strength of the braking signal activating its magnet or magnets. With another component valve, designated 4, the combination pressure modulator 6a exercises the functions of the pressure-regulating valve. The pressure-regulating valve 4 can be placed, by an appropriate activation of its own magnet (not shown) or of the magnet or magnets of the combination pressure modulator 6a, into an open position or a closed position or a pressure-maintenance position. In the open position, the inflow and outflow of the pressure-regulating valve 4 are connected with one another. In the closed position, the connection between the inflow and the outflow is closed. In the pressure-maintenance position, the connection between the inflow and the outflow is also closed, and the outflow also has a pressure-reduction connection, i.e. in the case of a pneumatic brake system with the atmosphere. The combination pressure modulator 6a can be designed as a pressure modulator with a pressure-regulating valve located downstream in the same housing, or with fully-integrated functions. It is apparent that, instead of the combination pressure modulator 6a, a pressure modulator and a separate pressure-regulating valve downstream can be used.

The combination pressure modulators 6a, 6b, 7a, 7b are connected axially on the inflow side with different pressure sources (not shown). The braking transmitter 11 includes two electrical circuits. The magnet or magnets of each combination pressure modulator can be controlled by each of these electrical circuits so that the brake system of the motor vehicle includes two electrical control circuits and two pressure medium circuits.

The trailer control valve 12, which belongs to the brake application apparatus, is controlled electrically by the braking signals of both circuits of the brake transmitter 11. The trailer control valve 12 is in communication in a known manner, via a pressure medium control line, with the trailer brake valve 15, which is designed in a known manner and therefore not described in any further detail.

The wheel brakes of the motor vehicle are in communication with the outflow side of the corresponding combination pressure modulator 6a, 6b, 7a, 7b.

In the pressure medium connections, between the trailer brake valve 15 and the wheel brakes of the axles II and IV of the trailer, there are electrically-controlled pressure-regulating valves 17a, 17b, 18a, 18b connected upstream of the corresponding wheel brakes. These pressure-regulating valves have the same functional characteristics as those described for the pressure-regulating valve 4 of the combination pressure modulator 6a.

Braking pressure sensors 3a, 3b, 8a, 8b, 16a, 16b, 19a and 19b, corresponding to the wheel brakes, are also provided.

An axle load sensor 24 assigned to axle II, and an axle load sensor 22 assigned to the axle IV, are provided.

The braking signal of the braking transmitter 11, as well as the signals of all the above-mentioned sensor devices and sensors, ar fed to an electronic control system 23, which is connected on the output side, with the operating magnets of the combination pressure modulators 6a, 6b, 7a, 7b and the pressure-regulating valves 17a, 17b, 18a, 18b. The control apparatus 23 contains a memory device and the comparative and/or computing units necessary to perform the functions described below. The electronic control system 23 can also contain other systems, possibly in connection with other required sensors (not shown), such as, anti-locking brakes, retarder control, drive systems which are regulated as a function of wheel slip, braking force regulators which operate as a function of retarder torque, etc. Of these systems, the anti-locking brake system must have priority over the invention. In contrast to the arrangement illustrated in FIG. 3, the above-mentioned devices integrated into the electronic control system can also be designed as separate components.

The above-mentioned memory unit contained in the electronic control system 23 contains, as the characteristic data, a coordination of signals from the sensors 1a, 1b, 10a, 10b, 13a, 13b, 21a, 21b and the axle load sensors 22 and 24, and control signals for the operation of the combination pressure modulators 6a, 6b, 7a, 7b and the pressure-regulating valves 17a, 17b, 21a, 21b. The electronic control system 23 (not described in any further detail) is designed so that when the brakes are applied, at a specified time after the initiation of the application, it polls the sensor devices 1a, 1b, 10a, 10b, 13a, 13b, 21a, 21b and, on the basis of the signals received, derives from the above-mentioned characteristic data, control signals for the operation of the combination pressure modulators in the motor vehicle and the pressure-regulating valves in the trailer.

The operation of the brake system (illustrated in FIG. 3), by the vehicle driver, is done by exerting a force on, or by moving the pedal(s) of the brake transmitter 11. The latter emits a braking signal to the electronic braking system 23, the strength of which is a function of the force exerted on the pedal, or the distance it has moved. After processing the braking signal, the electronic control system 23 emits control signals to the combination pressure modulators of the axles I, II and to the trailer control valve 12. The latter converts the braking signal, fed to it, into a control pressure for the operation of the trailer brake valve 15 which, for its part, releases a pressure corresponding to the control pressure to the wheel brakes of the axles III, IV from a pressure source (not shown). This pressure, before it flows into the wheel brakes as the braking pressure, is modified by the electronic control system 23 via the pressure-regulating valves 17a, 17b, 18a, 18b, according to the control signals coming from the above-mentioned characteristics for the wheel brake corresponding to the pressure-regulating valve in question, if the above-mentioned control signals are intended to produce a pressure modification.

The braking pressure is fed to the wheel brakes of the motor vehicle via the corresponding combination pressure modulator. The electronic control system 23 controls the combination pressure modulators simultaneously, according to the braking signal emitted by the brake transmitter 11 and the control signals derived from the above-mentioned characteristics. The combination pressure modulators in the embodiment operate digitally. By means of the braking pressure signals derived from the braking pressure sensors corresponding to the combination pressure modulators, the electronic control system 23 controls the combination pressure modulators in the sense of a similar accumulation of braking pressure in the wheel brakes.

The above-mentioned characteristics contained in the memory unit take into account, for the control signals of the combination pressure modulators of axle II and the pressure-regulating valves of axle IV, the axle load signals from the axle load sensors 24 and 22.

As a result of the interaction of the devices of the brake system, in the manner described above, it is possible to equalize the wheel brakes of each axle I to IV in relation to the braking forces or braking torques produced by them and/or the wheel brake temperatures which occur. In the first place, yawing moments are avoided, and the directional stability of the individual vehicles or of the combination of vehicles is thereby improved. At the same time, a uniform load on the wheel brakes is achieved. In this embodiment, the wheel brakes can be controlled by axle, in a known manner, by additional devices (load-controlled braking).

As a result of the interaction described above, however, it is also possible to equalize the wheel brakes of different axles individually or by axle, or the wheel brakes of the motor vehicle, with the wheel brakes of the trailer, with regard to the above-mentioned criteria.

The inclusion of the axle load signals supplied by the axle load sensors 22, 24, however, also makes possible an adjustment of the braking forces or braking torques by axle and/or the wheel brake temperatures, and therefore a distribution of the braking force which corresponds to the distribution of the axle load.

The electronic control system 23 is also designed so that it disables the function, described by the invention, if the braking signal fed by the brake transmitter 11 exceeds a specified value. This value is selected so that it signals the case of an emergency brake application. In this manner, it is guaranteed that, in an emergency, the invention will not result in the loss of any braking power.

The electronic control system 23, in the embodiment, is also designed so that it monitors the compliance with the parameters (braking pressure differences), defined by the control signals, by means of the braking pressure sensors 3a, 3b, 8a, 8b, 16a, 16b, 19a, 19b.

In a manner which will be apparent to a specialist in the field, the embodiment can be converted, by simple means, to a brake application apparatus which operates on a purely hydraulically or pneumatically-operated basis. For this purpose, the brake transmitter 11, in connection with the pressure modulators 5 of the combination pressure modulators, need only be replaced by a brake valve operating in a known manner and the trailer control valve 12, by a hydraulically or pneumatically-operated valve. In this case, the pressure-regulating valves 4 of the combination pressure modulators, which would no longer be present, would work together with the brake valve; and in the drawing, the pressure-regulating valves 17a to 19b would work together with the trailer brake valve 15.

Although the embodiment relates only to a service brake system, the invention can also be realized for an auxiliary brake and/or a parking brake system, or such systems can also be included in the service brake system.

If a vehicle-combination or its components represent more axles or more wheel brakes per axle than illustrated in the embodiment, the above remarks apply accordingly.

It is apparent that the remarks made previously, which were not mentioned in the preceding description of the figures, apply accordingly for the embodiment illustrated.

Moreover, it will be apparent to a specialist in the field that the above remarks do not exhaustively-describe the field of application of the invention. Specifically, all the remarks apply for a motor vehicle or a trailer as individual vehicles.

Instead of the braking pressures, electrical energy can also be used as the application force. The electrical energy is then applied in accordance with the invention.

I claim:

1. An apparatus which regulates brake pressure of each respective wheel brake during a brake application on a motor vehicle, having at least one fluid pressure responsive braking system supplied from a fluid pressure source, said apparatus comprising:
   (a) a brake valve positioned on such vehicle and connected to communicate such fluid pressure from such source to each of such respective wheel brakes during a brake application;
   (b) at least one sensing means positioned on such vehicle, adjacent each respective wheel brake, for determining at least one preselected parameter which is indicative of an amount of brake pressure being applied to a corresponding one of such respective wheel brakes during such brake application, and for generating a signal value representative of such brake pressure;
   (c) at least one electronically-controlled pressure-regulating valve, connected intermediate said brake valve and each of such respective wheel brakes, to control fluid pressure communication to a respective wheel brake associated with said regulating valve upon receipt of an appropriate command signal;
   (d) an electronic control system, positioned on such motor vehicle, and connected to receive said signal value from said sensing means, and connected to transmit said command signal to said regulating valves based upon an evaluation of said signal value of said brake pressure; and
   (e) a comparator associated with said electronic control system for evaluating said signal value of said brake pressure being applied to said corresponding one of such respective wheel brakes, said evaluation of said signal value of said brake pressure including comparing said signal value of said sensing device adjacent each such respective wheel with one another, and initiating a command signal to said regulating valve, corresponding to such wheel brake having a stronger signal, which will switch said regulating valve from an open position to one of a closed position and a bleed position until said stronger signal is reduced to one of a specified limit value, and a difference between said stronger signal and other signal values is substantially zero.

2. A brake pressure-regulating apparatus, according to claim 1, wherein such motor vehicle is a tractor portion of a tractor-trailer combination, and said apparatus further includes a trailer control valve positioned on one of such tractor portion and a trailer portion of such tractor-trailer combination, said trailer control valve having an inflow side connected to receive fluid pressure from said fluid pressure being supplied on the outflow side of said brake valve, said trailer control valve having an outflow side connection which is connectable to a trailer brake system to supply fluid pressure to such trailer brake system when such trailer is connected to such tractor portion.

3. A brake pressure-regulating apparatus, according to claim 2, wherein such motor vehicle is a tractor-trailer combination, and said trailer brake system comprises:
(a) a trailer brake valve positioned on one of such tractor portion and such trailer portion, said trailer brake valve having an inflow side connected to receive such fluid pressure from said trailer control valve, and an outflow side connected to communicate such fluid pressure to each respective wheel brake on such trailer during a brake application of such tractor-trailer;
(b) at least one sensing means positioned on such trailer adjacent each respective wheel brake for determining at least one preselected parameter, which is indicative of an amount of brake pressure being applied to a corresponding one of such respective wheel brakes during such brake application, and for generating a signal value representative of such brake pressure, and connected to transmit said signal value to said electronic control system; and
(c) at least one electronically-controlled pressure-regulating valve, connected intermediate said trailer brake valve and each of such respective wheel brakes, to control fluid pressure communication to a respective wheel brake associated with said regulating valve upon receipt of an appropriate command signal from said electronic control system.

4. A brake pressure-regulating apparatus, according to claim 1, wherein said preselected parameter is a current braking force being applied to a respective wheel brake, said sensing means measures said braking force.

5. A brake pressure-regulating apparatus, according to claim 1, wherein said preselected parameter is a current braking torque associated with a respective wheel brake, and said sensing means measures said braking torque.

6. A brake pressure-regulating apparatus, according to claim 1, wherein said preselected parameter is a wheel brake temperature, and said sensing means determines said temperature associated with a respective wheel brake.

7. A brake pressure-regulating apparatus, according to claim 1, wherein said preselected parameter is an amount of deformation of a selected brake component, and said sensing means measures said amount of deformation associated with a respective wheel brake.

8. A brake pressure-regulating apparatus, according to claim 6, wherein said temperature-sensing means measures temperature of a brake lining of such respective wheel brake.

9. A brake pressure-regulating apparatus, according to claim 8, wherein each of such respective wheel brakes is a disc brake, and said temperature-sensing means is positioned at least partially in at least one of a brake lining support and a brake lining and a disc.

10. A brake pressure-regulating apparatus, according to claim 8, wherein each of such respective wheel brakes is a drum brake, and said temperature-sensing means is positioned at least partially in at least one of a brake lining support and a brake lining and a drum.

11. A brake pressure-regulating apparatus, according to claim 8, wherein said temperature-sensing means includes a plurality of individual temperature sensors, and a temperature signal is determined in said electronic control system from one of an arithmetic and weighted average of said plurality of individual temperature signals.

12. A brake pressure-regulating apparatus, according to claim 1, wherein said regulating valve is a non-return and bleeder valve with an open position, a closed position, and a bleed position.

13. A brake pressure-regulating apparatus, according to claim 1, wherein said electronic control system further includes a memory storage unit, having a plurality of axle load characteristic values stored therein, and said brake pressure-regulating apparatus further includes an axle load-sensing means, positioned adjacent each respective axle on such vehicle for generating a signal value representative of different loads on each such respective axle of such vehicle, and for transmitting said signal value to said electronic control system for comparison of said signal value of each said respective axle load with said stored values of axle loads for adjusting said command signal to said regulating valve.

14. A brake pressure-regulating apparatus, according to claim 13, wherein said electronic control system further includes a means for updating said command signal, based on said signal value indicative of such brake pressure of each such respective wheel brake as determined by said sensing means during a brake application.

15. A brake pressure-regulating apparatus, according to claim 1, wherein such vehicle further includes a brake system anti-locking system, connected to supply a control signal to said electronic control system, and said electronic control system further includes a means for exerting priority control over each said pressure-regulating valve in response to said control signal of said anti-locking system.

16. A brake pressure-regulating apparatus, according to claim 1, wherein such vehicle brake system further includes a brake pedal which activates said brake valve when such brake pedal is depressed by an operator of such vehicle, and said brake pressure-regulating apparatus further comprises:
(a) means positioned on such vehicle for determining a distance such brake pedal is depressed and for generating a signal value that is representative of said distance; and
(b) means positioned in said electronic control system, connected to receive said distance signal value and for determining when said signal value represents an emergency braking of such vehicle, and for generating a control signal to override said command signal to said regulating valve during an emergency braking.

17. An apparatus which regulates brake pressure of each respective wheel brake during a brake application on a motor vehicle, having at least one electronically-controlled fluid pressure responsive braking system supplied from a fluid pressure source, said apparatus comprising:

(a) a brake application means positioned on such vehicle for generating a brake application signal when activated by an operator of such vehicle;

(b) at least one sensing means positioned on such vehicle, adjacent each respective wheel brake, for determining at least one preselected parameter which is indicative of an amount of brake pressure being applied to a corresponding one of such respective wheel brakes during such brake application, and for generating a signal value representative of such brake pressure;

(c) at least one electronically-controlled pressure modulating valve disposed on such vehicle, adjacent each respective wheel brake, for supplying fluid pressure to a corresponding wheel brake upon receipt of a brake signal;

(d) at least one electronically-controlled pressure-regulating valve, connected to said modulating valve, to control supply of fluid pressure to such respective wheel brake through said modulating valve upon receipt of an appropriate command signal;

(e) an electronic control system positioned on such vehicle and connected to receive said brake application signal from said brake application means and said signal value representative of such brake pressure, and connected to transmit said brake signal to said modulating valve upon receipt of said brake application signal and said command signal to said regulating valves based upon an evaluation of said signal value of such brake pressure; and (f) a comparator associated with said electronic control system for evaluating said signal value of said brake pressure being applied to said corresponding one of such respective wheel brakes, said evaluation of said signal value of said brake pressure including comparing said signal value of said sensing device adjacent each such respective wheel with one another, and initiating a command signal to said regulating valve, corresponding to such wheel brake having a stronger signal, which will switch said regulating valve from an open position to one of a closed position and a bleed position until said stronger signal is reduced to one of a specified limit value, and a difference between said stronger signal and other signal values is substantially zero.

18. A brake pressure-regulating apparatus, according to claim 17, wherein said moduating valve and said regulating valve are an integral combination valve.

19. A brake pressure-regulating apparatus, according to claim 18, wherein said apparatus further includes a pressure sensing means connected intermediate each such respective wheel brake and said combination valve for generating a second signal value representative of such pressure being applied to such respective wheel brake, and for transmitting said second signal value to said electronic control system.

20. A brake pressure-regulating apparatus, according to claim 17, wherein such motor vehicle is a tractor portion of a tractor-trailer combination, and said apparatus further includes an electronically-controlled trailer control valve positioned on one of such tractor portion and a trailer portion of such tractor-trailer combination, said trailer control valve connected on an inflow side to a source of fluid pressure, said trailer control valve having a connection, on the outflow side, that is connectable to a trailer brake system to supply fluid pressure to such trailer brake system when such trailer is connected to such tractor portion, and upon receipt of a control signal from said electronic control system when said brake application means is activated by such operator of such vehicle.

21. A brake pressure-regulating apparatus, according to claim 20, wherein such motor vehicle is a tractor-trailer combination, and said trailer brake system comprises:

(a) a trailer brake valve having an inflow side connected to receive such fluid pressure from said trailer control valve, and an outflow side connected to communicate such fluid pressure to each respective wheel brake on such trailer during a brake application of such tractor-trailer;

(b) at least one sensing means positioned on such trailer adjacent each respective wheel brake for determining at least one preselected parameter, which is indicative of an amount of brake pressure being applied to a corresponding one of such respective trailer wheel brakes during such brake application, and for generating a signal value representative of such brake pressure, and connected to transmit said signal value to said electronic control system; and (c) at least one electronically-controlled pressure-regulating valve, connected intermediate said trailer brake valve and each of such respective trailer wheel brakes, to control fluid pressure communication to a respective trailer wheel brake associated with said regulating valve upon receipt of an appropriate command signal from said electronic control system.

22. A brake pressure-regulating apparatus, according to claim 21, wherein said trailer brake system further includes a pressure-sensing means, connected intermediate each such respective wheel brake on such trailer portion and said regulating valve, for generating a third signal value that is representative of such brake pressure being applied to such respective wheel brake and for transmitting said third signal value to said electronic control system.

23. A brake pressure-regulating apparatus, according to claim 22, wherein said electronic control system further includes a memory storage unit, having a plurality of trailer axle load characteristic values stored therein, and said brake pressure-regulating apparatus further includes an axle load-sensing device, positioned adjacent each respective axle on such trailer for generating a signal value representative of different loads on such trailer, and for transmitting said signal value to said electronic control system for comparison of said signal value of such trailer with said stored values of axle loads for adjusting said command signal to said regulating valve.

24. A brake pressure-regulating apparatus, according to claim 18, wherein said preselected parameter is a current braking force being applied to a respective wheel brake, and said sensing means measures said braking force.

25. A brake pressure-regulating apparatus, according to claim 17, wherein said preselected parameter is a current braking torque associated with a respective wheel brake, and said sensing means measures said braking torque.

26. A brake pressure-regulating apparatus, according to claim 17, wherein said preselected parameter is a wheel brake temperature, and said sensing means determines said temperature associated with a respective wheel brake.

27. A brake pressure-regulating apparatus, according to claim 17, wherein said preselected parameter is an amount of deformation of a selected brake component, and said sensing means measures said amount of deformation associated with a respective wheel brake.

28. A brake pressure-regulating apparatus, according to claim 26, wherein said temperature-sensing means measures temperature of a brake lining of such respective wheel brake.

29. A brake pressure-regulating apparatus, according to claim 28, wherein each of such respective wheel brakes is a disc brake, and said temperature-sensing means is positioned at least partially in at least one of a brake lining support and a brake lining and a disc.

30. A brake pressure-regulating apparatus, according to claim 28, wherein each of such respective wheel brakes is a drum brake, and said temperature-sensing means is positioned at least partially in at least one of a brake lining support and a brake lining and a drum.

31. A brake pressure-regulating apparatus, according to claim 28, wherein said temperature-sensing means includes a plurality of individual temperature sensors, and a temperature signal is determined in said electronic control system from one of an arithmetic and weighted average of said plurality of individual temperature signals.

32. A brake pressure-regulating apparatus, according to claim 21, wherein said regulating valve is a non-return and bleeder valve with an open position, a closed position, and a bleed position.

33. A brake pressure-regulating apparatus, according to claim 17, wherein said electronic control system further includes a means for updating said command signal based on said signal value indicative of such brake pressure of each such respective wheel brake as determined by said sensing means during a brake application.

34. A brake pressure-regulating apparatus, according to claim 17, wherein such vehicle further includes a brake system anti-locking system connected to supply a control signal to said electronic control system, and said electronic control system further includes a means for exerting priority control over each said pressure-regulating valve in response to said control signal of said anti-locking system.

35. A brake pressure-regulating apparatus, according to claim 18, wherein such vehicle brake system further includes a brake signal transmitter control element, which activates said electronic control system when such transmitter is moved by such operator of such vehicle and said brake pressure-regulating apparatus further comprises:
(a) means positioned on such vehicle for determining a distance such transmitter is moved, and for generating a signal value that is representative of said distance; and
(b) means positioned in said electronic control system connected to receive said distance signal value and for determining when said signal value represents an emergency braking of such vehicle, and for generating a control signal to override said command signal to said regulating value during an emergency braking.

* * * * *

UNITED STATES PATENT AND TRADEMARK OFFICE
CERTIFICATE OF CORRECTION

PATENT NO. : 4,685,745
DATED      : August 11, 1987
INVENTOR(S) : Erich Reinecke It is certified that error appears in the above-identified patent and that said Letters Patent are hereby corrected as shown below:

Column 21, line 51, delete "18" and insert --17--

Column 22, line 57, delete "18" and insert --17--

Column 24, line 17, delete "18" and insert --17-- line 32, delete "value" and insert --valve--

Signed and Sealed this

Twenty-fourth Day of May, 1988

Attest:

DONALD J. QUIGG

Attesting Officer

Commissioner of Patents and Trademarks